United States Patent [19]

Edgar

[11] 4,164,314
[45] Aug. 14, 1979

[54] SINGLE USE DISPOSABLE CAT LITTER PACKAGE

[75] Inventor: Allen C. Edgar, Gainesville, Fla.

[73] Assignee: Mid-Florida Mining Company, Lowell, Fla.

[21] Appl. No.: 908,719

[22] Filed: May 23, 1978

[51] Int. Cl.² ............................................. B65D 5/22
[52] U.S. Cl. ......................................... 229/33; 119/1; 229/17 R
[58] Field of Search ................ 229/3.5 MF, 33, 17 R; 119/1

[56] References Cited

U.S. PATENT DOCUMENTS

| | | | |
|---|---|---|---|
| 1,616,014 | 2/1927 | Walter | 229/33 |
| 1,667,869 | 5/1928 | Peterson | 229/33 X |
| 2,298,146 | 10/1942 | Mersbach | 229/3.5 MF X |
| 3,028,950 | 4/1962 | Content | 229/3.5 MF X |
| 3,038,463 | 6/1962 | Daymon | 229/3.5 MF X |
| 3,743,170 | 7/1973 | Riccio | 119/1 X |
| 3,827,622 | 8/1974 | McLoud | 229/17 R X |
| 3,869,077 | 3/1975 | Tuura | 229/17 R X |
| 4,014,292 | 3/1977 | Coughlin et al. | 119/1 |

Primary Examiner—Davis T. Moorhead
Attorney, Agent, or Firm—Littlepage, Quaintance, Murphy, Richardson and Webner

[57] ABSTRACT

A single use disposable package formed from a corrugated paper or fiberboard or other paperboard blank made into a six-sided box for containing cat litter. The package is used in the open position where the top section of the box is held rigidly by the mutual engagement of tabs and slots formed by perforations in the top sections. One top section is perforated and scored to enable part of that top section to be folded downwards and inwards to make an adjustable-sized opening for the entry and exit of a cat.

4 Claims, 9 Drawing Figures

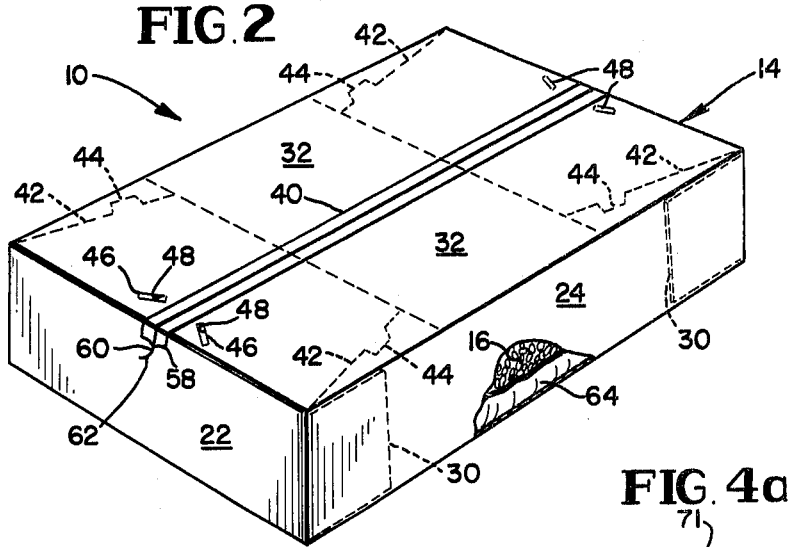
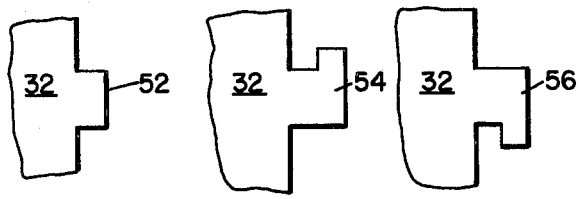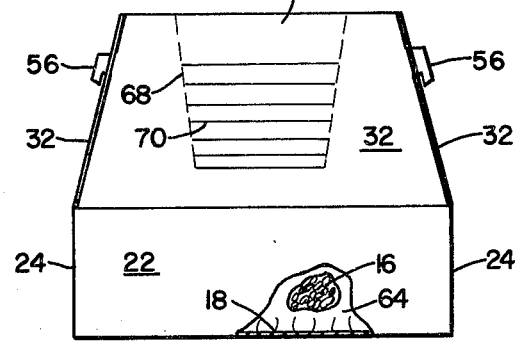
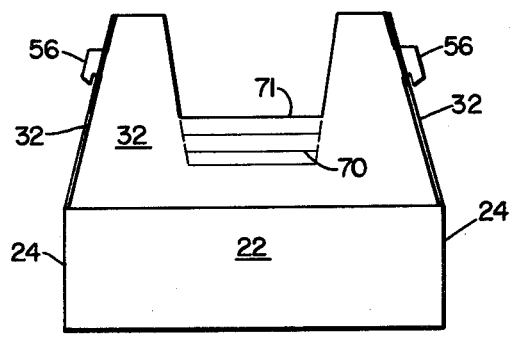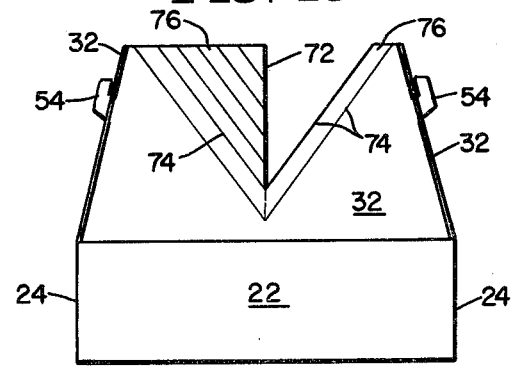
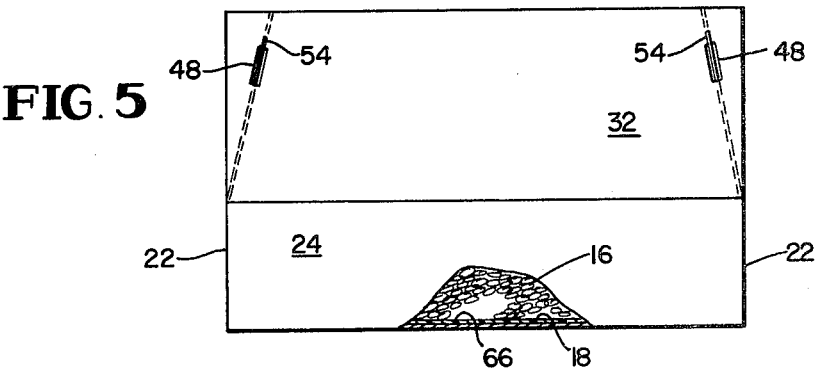

SINGLE USE DISPOSABLE CAT LITTER PACKAGE

BACKGROUND OF THE INVENTION

Cat litter is a disposable material generally sold in large size bags containing enough cat litter material for several refills of a cat litter box. The box is generally not disposable but made of plastic, metal or other material. Cat litter is poured into the box usually to a depth of about one to three inches and periodically, as necessary, the cat litter in the box is emptied out and the box is refilled with fresh litter material. Litter containers used by cats are often difficult to clean, making the cleaning task unpleasant. Disposable containers have been tried and used on a limited basis but many of these have had certain inherent disadvantages, such as the unreliability of the container to retain the particular litter material, instability of the container structure, and the excess expense of providing a dependable, disposable container each time the litter is discarded.

It is therefore an object of the invention to provide a litter box which is substantially free of the disadvantages of the prior art.

Another object of the invention is to provide a cat litter box which serves as a package for merchandising cat litter.

It is another object of the invention to provide both the cat litter box and the litter in one easy-to-open package.

A further object of the invention is to provide a combination cat box and litter package which can be easily handled in shipment and effectively displayed.

It is yet another object of the invention to provide a cat litter box which can be easily disposed of while still containing the cat litter, in a sanitary fashion.

It is still another object of the invention to provide a sturdy, moisture resistant, disposable cat litter box.

SUMMARY OF THE INVENTION

The invention provides a disposable package having a compact, closed, six-sided configuration containing dry, absorbent and preferrably deodorizing cat litter. Various types of litter material may be used in the cat box. A well-known litter material consists of granular, absorbent clay which may contain a odor depressant chemical, which material will absorb urine and minimize the odor from the solid waste.

The package is designed to be easily handled and effectively displayed on the store shelf, easily carried home and put into use without the necessity of having to store a bulky bag of cat litter. The box contains sufficient cat litter for a single use. When the litter material has been sufficiently used, the package is closed and discarded without the user having to throw the cat litter away, clean the box, or in any way handle the used cat litter.

The package is adequately inexpensive to make on a tray-maker machine, so that it is economical for a single use before disposal. There are many places and occasions where a single-use disposable cat litter box has a great advantage over any other, for example, in apartments or on vacations.

Additional features and advantages of the present invention will become apparent from the following description and accompanying drawings.

BRIEF DESCRIPTION OF THE DRAWINGS

FIG. 2 is a perspective view of the disposable litter box when it is ready to be opened.

FIGS. 3a, 3b and 3c are alternative embodiments of the shape of the tabs.

FIG. 4a is a plan view of one side of the disposable litter box of this invention as it appears just before use.

FIG. 4b is a plan view of the same side of the disposable litter box of this invention as it appears during use.

FIG. 4c is a plan view of one side of another embodiment of the disposable litter box of this invention as it appears just before use.

FIG. 5 is a plan view of another side of the disposable litter box of this invention as it appears during use.

DESCRIPTION OF THE PREFERRED EMBODIMENTS

Figure 1:
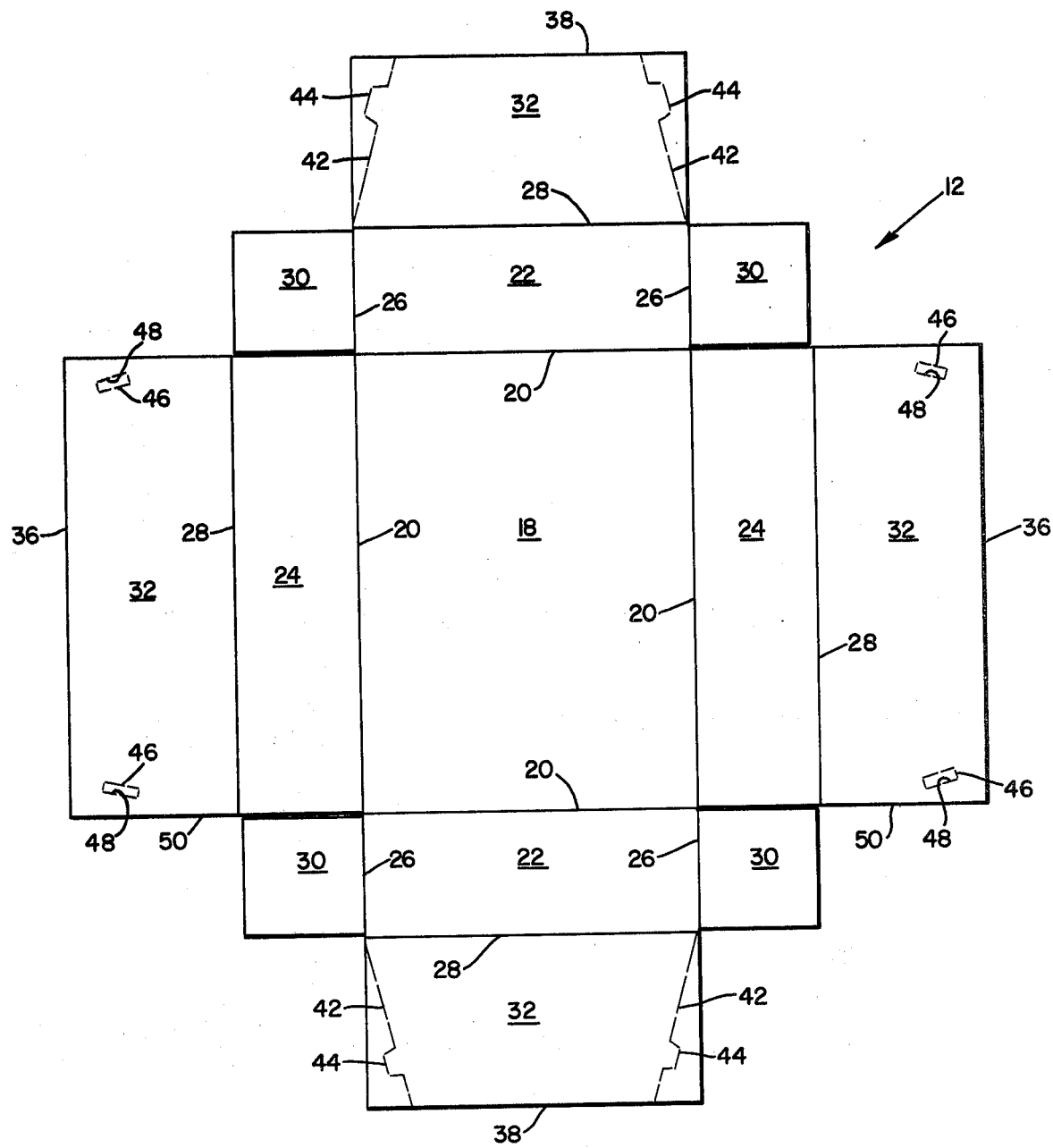
FIG. 1 is a plan view of a blank used for constructing the disposable litter box of this invention.

The disposable package is shown in FIGS. 1 through 5. The disposable package 10 is formed from a corrugated paper or fiberboard or other paperboard blank 12 made into a six-sided box 14 containing cat litter 16. The blank 12 may be coated at least partially on one surface, which will be the inside of the box 14 with a wax, polyethylene or other suitable coating to assist in improving resistance to moisture such as that which may be encountered from pet or animal urine. FIG. 1 is a plan view of blank 12 which comprises a horizontal rectangular base 18 having four edges 20, two pairs 22 and 24 of opposite vertical sides each extending upwards from one edge 20 of the horizontal rectangular base 18, each vertical side 22 and 24 having two vertical side edges 26 and a horizontal top edge 28. Rectangular corner flaps 30 extend from each vertical side edge 26 of a first pair 22 of said opposite vertical sides, said rectangular corner flaps 30 being folded and adhered to a second pair 24 of said opposite vertical sides to form the box 14. Inner top sections and outer top sections 32 extend from the horizontal top edge 28 of each of said vertical sides 22 and 24, and are scored along the horizontal top edge 28 to fold inward from the vertical sides 22 and 24 to form a horizontal top 34 to the box 14, parallel to said base 18. At least one pair of opposite top sections 32 have abutting edges 36 or 38 on top of the box 14 when the top sections are folded to close the box 14. The box is shown closed in FIG. 2. FIG. 2 shows adhesive means 40 for securing the top sections 32 to close the box 14. Alternatively, the box 14 may be sealed with spot or breakaway gluing of the underside of outer top sections 32 to the upper side of inner top sections 32. A first pair of opposite top sections 32 of blank 12 have perforations 42 outlining a pair of tabs 44 and a second pair of opposite top sections 32 have perforations 46 outlining slots 48 near the edges 50 of the second pair of top sections 32. The tabs 44 and slots 48 are engagable one with the other. The tabs 44 can be of various alternative shapes as shown in FIGS. 3a, 3b and 3c. FIG. 3a shows a rectangular tab 52. FIG. 3b shows a tab 54 which would lock easily and inexpensively into slot 48. FIG. 3c shows another type of locking tab 56. Tabs such as those shown in FIGS. 3b and 3c are preferred shapes. Other suitable shapes for these tabs will be apparent to a skilled artisan. When the box is opened tabs with a hook shape 54, 56 lock into the slots 48 more firmly than tabs 52 of rectangular shape.

In order to put the package 10 into use the box is first opened by releasing adhesive means 40. Adhesive means 40 can comprise any suitable means of closing the top sections 32 of the box 14. A suitable adhesive means 40 is a strip 58 of adhesive paper having a pull-cord 60 secured to the adhesive under the strip 58. The adhesive strip 58 with the pull-cord 60 is adhered to cover at least the length of the abutting edges 36 that secure the pair of opposite top sections 32 having abutting edges 36 on top of the box 14. At least one of the ends 62 of the pull-cord 60 is unsecured and visible on the outside of the package 10.

In order to put the package into use when it is brought home from the store, the adhesive means 40 are first removed by pulling on the end 62 of pull-cord 60 thus releasing the two top sections 32 of the box 14. The four top sections 32 are then opened up and perforations 42 are slit to release tabs 44, and perforations 46 are slit to release slots 48. Tabs 44 can then be engaged in slots 48. The cat litter 16 is ready for use in the box 14. Alternately the cat litter 16 can be in a flexible bag 64, shown in FIG. 2, from which it can be poured into the box 14. The cat litter 16 can be on the base 18 of the box 14 or there can be a liner 66, shown in FIG. 5, of paper which may be coated with a moisture-resistant coating or the liner may be of plastic, covering the base 18 of the box 14. One of the top sections 32 of the box 14 is perforated and scored to enable a part of that top section 32 to be folded downwards and inwards when the box 14 is in an open position to make an adjustable side opening to facilitate the entry and exit of a cat. FIG. 4a shows top section 32 having perforations 68 and horizontal scoring 70. Perforations 68 are slit and horizontal scores 70 are folded so that flap 71 is partially released. FIG. 4b shows the cat litter box 14 ready for use with flap 71 folded down leaving an aperture in side 32 for entry or exit of a cat. Flap 71 can be folded down to any of scored lines 70 to make an appropriately sized aperture. FIG. 4c shows another embodiment of the perforation 72 and diagonal scoring 76 of top section 32. A single perforation 72 is slit and flaps 76 are folded downwards and inwards along a diagonal score 74 to make an appropriately sized V-shaped aperture for the entry and exit of a cat.

The blank can be made out of any suitable corrugated paper or fiberboard or other paperboard, for example corrugated kraft paperboard, with a white facing on the outside suitable for printing multi-colored advertising material necessary for marketing the package. The blank may also be made of fiberboard paper of proper rigidity. The inside facing of the corrugated or other paperboard can be coated with wax or plastic rendering it moisture resistant. The corner flaps 30 are glued preferably to the outside of sides 24 but can be glued to the inside of sides 24. In addition, a lining sheet of paper of plastic may be placed on the base of the box. The box according to this invention is easy and economical to make on a standard tray-maker machine as is well known in the packaging art. FIG. 5 shows an assembled cat litter box 14 with a liner 66 underneath the cat litter 16. FIG. 2 shows the cat litter contained in flexible bag 64.

The package has the advantage of being easy and economical to construct, easy to assemble at home, of suitable design for practical use by a cat and it can be disposed of in an easy and sanitary manner when the cat litter has been used. For disposal the tabs are disengaged from the slots and the top sections 32 are folded down to enclose the used cat litter 16 without the user having to pour away the litter or clean a litter box.

Although the invention has been described in considerable detail with reference to certain preferred embodiments thereof, it will be understood that variations and modifications can be effected within the spirit and scope of the invention as described above and as defined in the appended claims.

What is claimed is:

1. A disposable package formed from a paperboard blank having at least a part of one surface coated with a moisture-resistant coating made into a six-sided box for containing cat litter, said package comprising:
   A. A horizontal rectangular base having four edges,
   B. Two pairs of opposite vertical sides each extending upward from one edge of the horizontal rectangular base, each vertical side having two vertical side edges and a horizontal top edge.
   C. Rectangular corner flaps, extending from each vertical side edge of a first pair of said opposite vertical sides, said rectangular corner flaps being folded and adhered to a second pair of said opposite vertical sides to form the box,
   D. Top sections extending from the horizontal top edge of each of said vertical sides, scored to fold inwards from the vertical sides forming a horizontal top to the box parallel to said base, at least one pair of opposite top sections having abutting edges on top of the box, and wherein each top section of a first pair of opposite top sections further comprise perforations outlining a pair of tabs, and wherein a second pair of opposite top sections further comprise perforations outlining slots near the edges of said second pair of top sections, said tabs and slots being engagable one with the other, and wherein one top section of the box further comprises at least one vertical perforation and horizontal or diagonal scoring to enable a part of said top section to be folded downwards and inwards when the box is in an open position to make an adjustable-sized opening to facilitate the entry and exit of a cat,
   E. Adhesive means for securing the top sections, closing the box, said adhesive means comprising a strip of adhesive paper having a pull-cord secured to the adhesive under the strip, along the length of the strip, securing said pair of opposite top sections having abutting edges on top of the box, wherein at least one of the ends of said pull-cord is unsecured and visible on the outside of the package, and
   F. A flexible bag containing the cat litter.

2. A disposable package formed from a corrugated paperboard blank made into a six-sided box for containing cat litter, said package comprising:
   A. A horizontal rectangular base having four edges,
   B. Two pairs of opposite vertical sides each extending upward from one edge of the horizontal rectangular base, each vertical side having two vertical side edges and a horizontal top edge,
   C. Rectangular corner flaps, extending from each vertical side edge of a first pair of said opposite vertical sides, said rectangular corner flaps being folded and adhered to a second pair of said opposite vertical sides to form the box,
   D. Top sections extending from the horizontal top edge of each of said vertical sides, scored to fold inwards from the vertical sides forming a horizontal top to the box parallel to said base, at least one pair of opposite top sections having abutting edges on top of the box, each top section of a first pair of opposite top sections further comprising perforations outlining a pair of tabs, each top section of the second pair of opposite top sections further comprising perforations outlining slots near the edges of said second pair of top sections, said tabs and slots being engageable one with the other, one top section of the box further comprising at least one perforation and a plurality of parallel scorings to enable a part of said top section to be folded downwards and inwards to make an adjustable-sized opening to facilitate the entry and exit of a cat.

3. The disposable package of claim 2 wherein the perforations are approximately vertical and the scoring is horizontal.

4. The disposable package of claim 2 wherein the perforation is vertical and the scoring is diagonal.

* * * * *